US011016853B2

(12) United States Patent
Kim et al.

(10) Patent No.: US 11,016,853 B2
(45) Date of Patent: May 25, 2021

(54) METHOD FOR DISPLAYING TIME INFORMATION IN LOW POWER STATE AND ELECTRONIC DEVICE INCLUDING THE SAME

(71) Applicant: Samsung Electronics Co., Ltd., Suwon-si (KR)

(72) Inventors: Eunchul Kim, Suwon-si (KR); Jaejoon Seo, Suwon-si (KR); Woojin Sim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 15/688,232

(22) Filed: Aug. 28, 2017

(65) Prior Publication Data

US 2018/0060175 A1    Mar. 1, 2018

(30) Foreign Application Priority Data

Aug. 30, 2016 (KR) .......................... 10-2016-0111142

(51) Int. Cl.
*G06F 11/14* (2006.01)
*G06F 16/48* (2019.01)
(Continued)

(52) U.S. Cl.
CPC ......... *G06F 11/1417* (2013.01); *G04G 19/12* (2013.01); *G06F 1/24* (2013.01);
(Continued)

(58) Field of Classification Search
CPC ...... G06F 11/1417; G06F 16/489; G06F 1/24; G06F 1/3212; G06F 3/1407; H04L 12/12;
(Continued)

(56) References Cited

U.S. PATENT DOCUMENTS 6,967,647 B2 * 11/2005 Nokiyama ........... G09G 3/3406
345/204
7,287,172 B2 * 10/2007 Parker .................. G06F 1/1626
713/310
(Continued)

FOREIGN PATENT DOCUMENTS

CN 101937342 A 1/2011
CN 104602327 A 5/2015
(Continued)

OTHER PUBLICATIONS

Tetsujin: "Apple Watch—Power Reserve", Jun. 27, 2015 (Jun. 27, 2015), pp. 1-1, XP055643017, Retrieved from the Internet: URL:https://apple.stackexchange.com/questions/193319/power-reserve-mode-lightning-bolt [retrieved on Nov. 15, 2019].
(Continued)

*Primary Examiner* — Pinping Sun
(74) *Attorney, Agent, or Firm* — Jefferson IP Law, LLP

(57) ABSTRACT

A method for displaying time information in an electronic device in a low power state is provided. The method includes transferring a power-off command and a reboot command to the electronic device if a power level of a battery is equal to or less than a first level, setting a power-off flag in a boot loader, entering into a power-off state, and displaying, on a display, current time related information for a predetermined time under the control of the boot loader if a specific event occurs in the power-off state.

17 Claims, 11 Drawing Sheets

(51) Int. Cl.
  *G06F 1/3212* (2019.01)
  *G04G 19/12* (2006.01)
  *G06F 1/24* (2006.01)
  *H04L 12/12* (2006.01)
  *H04W 52/02* (2009.01)

(52) U.S. Cl.
  CPC .......... *G06F 1/3212* (2013.01); *G06F 16/489* (2019.01); *H04L 12/12* (2013.01); *H04W 52/0209* (2013.01); *H04W 52/0229* (2013.01); *H04W 52/0264* (2013.01); *H04W 52/0274* (2013.01); *Y02D 10/00* (2018.01); *Y02D 30/70* (2020.08)

(58) Field of Classification Search
  CPC ............. Y02D 70/1262; Y02D 70/164; Y02D 70/166; Y02D 70/1242; Y02D 70/142; Y02D 70/144; Y02D 70/168; Y02D 70/1264; Y02D 70/26; Y02D 10/174; Y02D 70/20; H04W 52/0229; H04W 52/0264; H04W 52/0274; H04W 52/0209; G04G 19/12; H04M 1/72552; H04M 1/72555; H04M 1/72563; H04M 1/72566
  See application file for complete search history.

(56) References Cited

U.S. PATENT DOCUMENTS

| | | | | |
|---|---|---|---|---|
| 7,765,393 | B1 * | 7/2010 | Lee | G06F 9/4401 713/2 |
| 8,125,186 | B2 * | 2/2012 | Carkner | H02J 7/0047 320/132 |
| 8,144,120 | B2 * | 3/2012 | Vassigh | G06F 3/04895 345/156 |
| 8,583,190 | B1 * | 11/2013 | Kopikare | H04W 52/52 455/574 |
| 8,635,481 | B1 * | 1/2014 | Lachwani | G06F 1/3206 713/330 |
| 8,716,977 | B2 * | 5/2014 | Walley | H01M 10/44 320/108 |
| 8,971,154 | B2 * | 3/2015 | Wei | G04R 20/00 368/47 |
| 8,972,760 | B1 * | 3/2015 | Zajac | G06F 1/3212 713/320 |
| 9,268,367 | B2 * | 2/2016 | Aguera y Arcas | G06F 1/1645 |
| 2005/0151849 | A1 * | 7/2005 | Fitzhugh | G04G 5/00 348/207.99 |
| 2006/0294593 | A1 * | 12/2006 | Eldar | G06F 1/14 726/26 |
| 2011/0055538 | A1 * | 3/2011 | Cho | G06F 9/4418 713/2 |
| 2011/0154007 | A1 * | 6/2011 | Juvonen | G06F 1/3212 713/2 |
| 2012/0084734 | A1 * | 4/2012 | Wilairat | G06F 21/36 715/863 |
| 2012/0315960 | A1 * | 12/2012 | Kim | H04W 52/0254 455/574 |
| 2013/0005252 | A1 * | 1/2013 | Lee | H02J 7/025 455/41.1 |
| 2013/0040662 | A1 * | 2/2013 | Eliseo | H04W 52/027 455/456.3 |
| 2014/0111018 | A1 * | 4/2014 | Kwon | H02J 5/005 307/104 |
| 2014/0253043 | A1 * | 9/2014 | Cho | G08B 21/182 320/134 |
| 2015/0195789 | A1 * | 7/2015 | Yoon | G06F 3/0488 345/173 |
| 2015/0228048 | A1 * | 8/2015 | Heo | G06F 1/3293 345/502 |
| 2015/0243245 | A1 | 8/2015 | Jung | |
| 2016/0041597 | A1 | 2/2016 | Graham et al. | |
| 2016/0041606 | A1 * | 2/2016 | Andrews | G06F 1/3212 713/320 |
| 2016/0062450 | A1 * | 3/2016 | Han | G06F 1/3265 715/778 |
| 2016/0104461 | A1 * | 4/2016 | Gao | G04G 9/0005 345/545 |
| 2016/0162256 | A1 | 6/2016 | Komaromi et al. | |
| 2016/0247306 | A1 | 8/2016 | Jang et al. | |
| 2016/0268843 | A1 * | 9/2016 | Baarman | H02J 50/80 |
| 2016/0309416 | A1 | 10/2016 | Gao | |
| 2017/0075316 | A1 * | 3/2017 | Berdinis | G04G 19/06 |

FOREIGN PATENT DOCUMENTS

| | | | |
|---|---|---|---|
| CN | 105786315 A | 7/2016 | |
| EP | 2 891 969 A1 | 7/2015 | |
| EP | 2 996 019 A1 | 3/2016 | |
| KR | 10-2003-0061105 A | 7/2003 | |
| KR | 10-2005-0001526 A | 1/2005 | |
| KR | 10-2013-0007258 A | 1/2013 | |
| KR | 10-2014-0073946 A | 6/2014 | |
| WO | WO-2008093278 A1 * | 8/2008 | .......... G06F 1/3203 |
| WO | WO-2015027316 A1 * | 3/2015 | |
| WO | 2016/022496 A2 | 2/2016 | |
| WO | WO-2017088549 A1 * | 6/2017 | ............. H04M 1/73 |

OTHER PUBLICATIONS

Jeff Benjamin: "How to use Power Reserve mode on Apple Watch", May 5, 2015 (May 5, 2015), XP055643021, Retrieved from the Internet: URL:https://www.idownloadblog.com/2015/05/05/how-to-usepower-reserve-mode-apple-watch/ [retrieved on Nov. 15, 2019].
European Office Action dated Nov. 26, 2019, issued in European Application No. 17188355.6.
Chinese Office Action dated May 8, 2020, issued in Chinese Application No. 201710759996.8.

* cited by examiner

METHOD FOR DISPLAYING TIME INFORMATION IN LOW POWER STATE AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Aug. 30, 2016 in the Korean Intellectual Property Office and assigned Serial number 10-2016-0111142, the entire disclosure of which is hereby incorporated by reference.

TECHNICAL FIELD

The present disclosure relates to a method for displaying time information for a long time (duration) to a user even in a low power state and an electronic device including the same.

BACKGROUND

A wearable computer or a wearable device may include an electronic device in a wearable form, such as glasses, watches, and clothes. With an attempt to extend to a connected device after activation of a smart phone, an electronic device, such as a wearable device, may interlock with a smart phone or a portable phone to perform notification functions, such as a message, e-mail, call reception, and social network service (SNS). Further, the wearable device may tend to independently perform the above-described functions.

The electronic device, such as the wearable device, may be worn on the user's body, like accessories, to communicate with the user at the closest location to the user's body. The wearable device can seamlessly and continuously collect in real time detailed information on the surrounding environment or personal body changes. For this, technical researches are under way for low power technology for the long-term use of the wearable device and for material miniaturization, elasticity, and flexibility for improvement of the wearing feeling of the wearable device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, such as a wearable device, is required to continuously provide information to a user while operating for a long time.

Another aspect of the present disclosure is to provide a method for displaying time information in a low power state and an electronic device supporting the method.

In accordance with an aspect of the present disclosure, a method for displaying time information in an electronic device in a low power state is provided. The method includes transferring a power-off command and a reboot command to the electronic device if a power level of a battery is equal to or less than a first level; setting a power-off flag in a boot loader, entering into a power-off state, and displaying on a display current time related information for a predetermined time under the control of the boot loader if a specific event occurs in the power-off state.

In accordance with another aspect of the present disclosure, an electronic device is provided. The electronic device includes a memory including a boot read only memory (ROM) configured to store a boot loader therein, a power management module, a power button configured to transfer a user input to the power management module, a display, and at least one processor configured to transfer a power-off command and a reboot command to the electronic device if a power level of a battery is equal to or less than a first level, set a power-off flag in a boot loader, and enter a power-off state, and the power management module is configured to control the boot loader to display on the display current time related information for a predetermined time if a specific event occurs in the power-off state.

According to the display method in a low power mode and the electronic device supporting the same according to the aspects of the present disclosure, it is possible to provide information to a user for a long time using the minimum power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
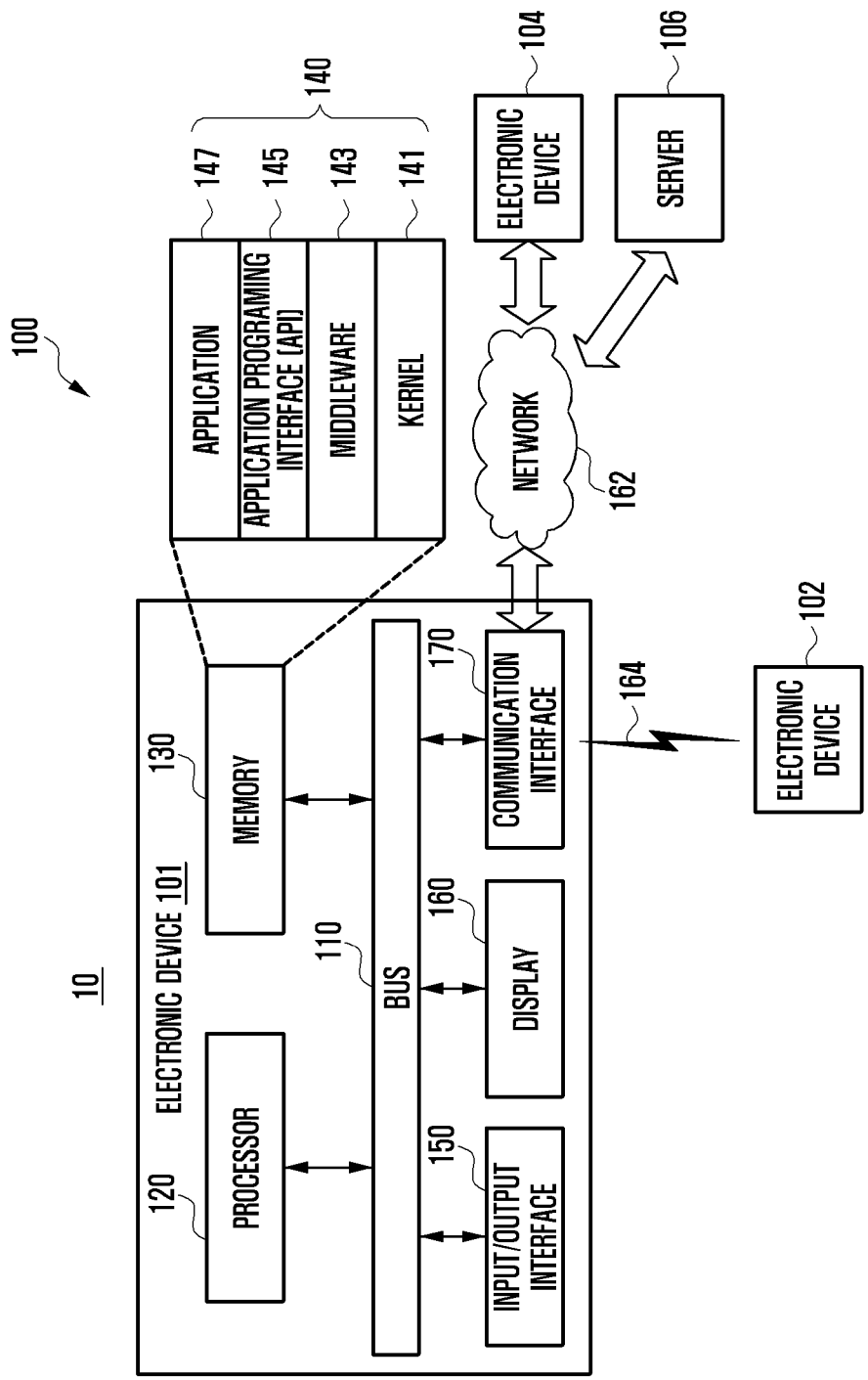
FIG. 1 is a diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, a wearable device (for example, a head-mounted-device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a television (TV), a digital video disc (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, magnetic resonance angiography (MRA), magnetic resonance imaging (MRI), computed tomography (CT), a scanner, an ultrasonic device and the like), a navigation device, a global navigation satellite system (GNSS) receiver, an event data recorder (EDR), a flight data recorder (FDR), a vehicle infotainment device, electronic equipment for a ship (for example, a navigation device for ship, a gyro compass and the like), avionics, a security device, a head unit for a vehicle, an industrial or home robot, an automatic teller machine (ATM) of financial institutions, and a point of sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to one embodiment of the present disclosure, a screen of an electronic device may be split into at least two windows according to a predefined split manner and displayed through a display of an electronic device. The windows are defined as split windows. According to one embodiment, the split windows are defined as windows displayed on a display of an electronic display not to be superposed one on another.

According to one embodiment, a popup window is defined as a window displayed on a display of an electronic device to hide or to be superposed on a portion of a screen under execution.

According to one embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 10 including an electronic device 101 according to various embodiments of the present disclosure. Referring to FIG. 1, the electronic device 100 includes a bus 110, a processor 120, a memory 130, an input/output interface 150, a display 160 and a communication interface 170.

Referring to FIG. 1, the bus 110 may be a circuit connecting the above described components and transmitting communication (for example, a control message) between the above described components. The processor 120 receives commands from other components (for example, the memory 130, the input/output interface 150, the display 160, the communication interface 170) through the bus 110, analyzes the received commands, and executes calculation or data processing according to the analyzed commands. The memory 130 stores commands or data received from the processor 120 or other components (for example, the input/output interface 150, the display 160, or the communication interface 170) or generated by the processor 120 or other components. The memory 130 may include programming modules 140, for example, a kernel 141, middleware 143, an application programming interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 147.

The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user, and transfer the received command and/or data to the processor 120 and/or the memory 130 through the bus 110. The display 160 can display an image, a video, and/or data to a user.

According to an embodiment, the display 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication interface 170 connects communication between the electronic device 100 and the external device (for example, electronic device 102, 104 or server 106). For example, the communication interface 170 may access a network 162 through wireless or wired communication to communicate with the external device 104 or the server 106, or communicate with the external device 102 via near-field communication 164 (e.g., Wi-Fi, Bluetooth or the like). The wireless communication includes at least one of, for example, Wi-Fi, Bluetooth (BT), near field communication (NFC), a GNSS, and cellular communication (for example, long term evolution (LTE), LTE advanced (LTE-A), code division multiple access (CDMA), wideband CDMA (WCDMA), universal mobile telephone system (UMTS), wireless broadband (WiBro) or global system for mobile (GSM)). The wired communication may include at least one of, for example, a universal serial bus (USB), a high definition multimedia interface (HDMI), recommended standard 232 (RS-232), and a plain old telephone service (POTS).

According to an embodiment, the server 106 supports driving of the electronic device 100 by performing at least one operation (or function) implemented by the electronic device 100. For example, the server 106 may include a communication control server module that supports the communication interface 170 implemented in the electronic device 100. For example, the communication control server module may include at least one of the components of the communication interface 170 to perform (on behalf of) at least one operations performed by the communication interface 170.

Figure 2:
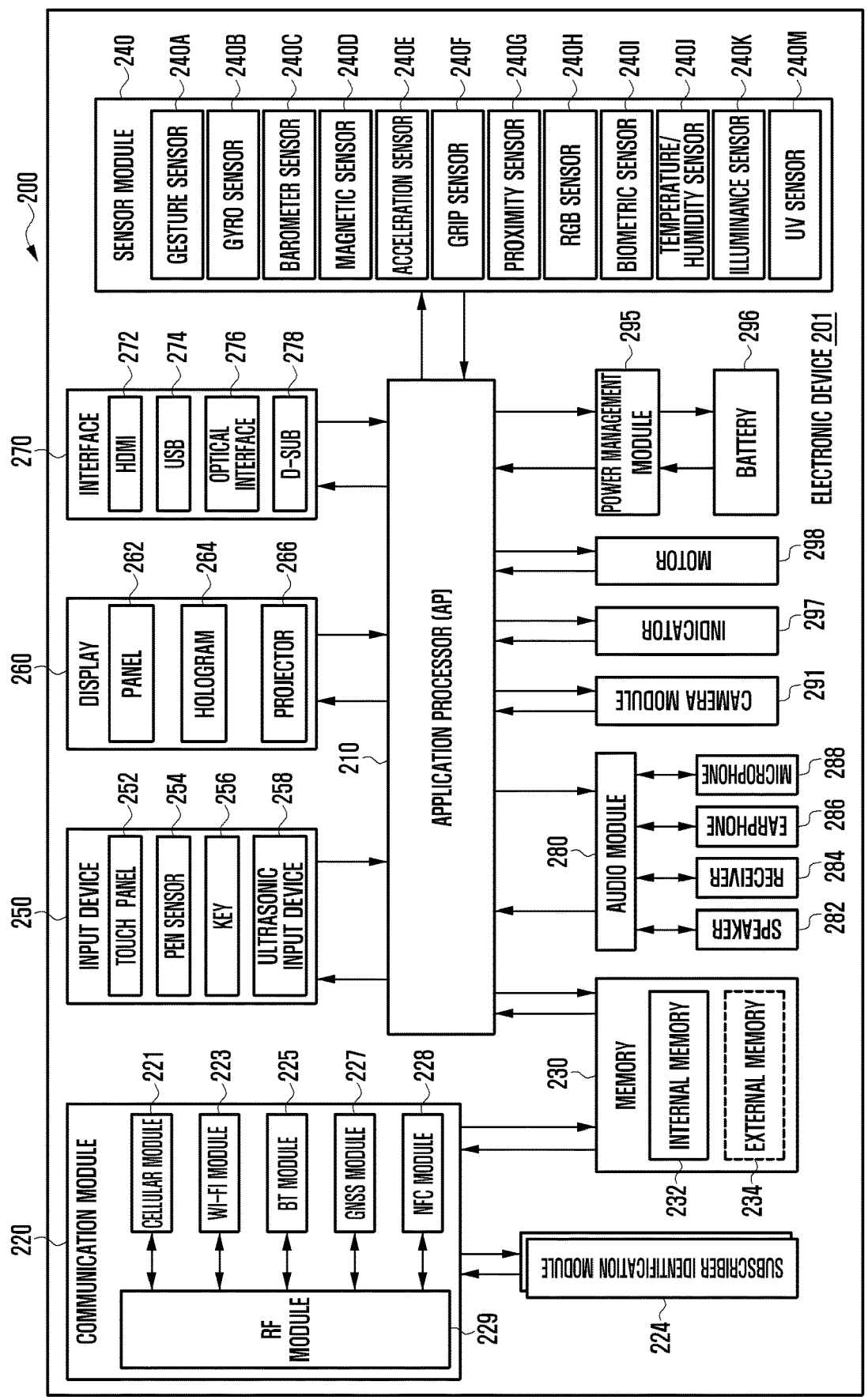
FIG. 2 is a block diagram of an electronic device according to various embodiments of the present disclosure.

FIG. 2 is a block diagram 200 of an electronic device 201 according to various embodiments of the present disclosure. The electronic device 201 may configure, for example, a whole or a part of the electronic device 100 illustrated in FIG. 1. Referring to FIG. 2, the electronic device 201 includes one or more application processors (APs) 210, a communication interface 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a system on chip (SoC). According to an embodiment, the processor 210 may further include a graphic processing unit (GPU).

The communication interface 220 (for example, communication interface 170) transmits/receives data in communication between different electronic devices (for example, the electronic device 104 and the server 106) connected to the electronic device 201 (for example, electronic device 100) through a network. According to an embodiment, the communication interface 220 includes a cellular module 221, a Wi-Fi module 223, a BT module 225, a GNSS module 227, a NFC module 228, and a radio frequency (RF) module 229.

The cellular module 221 provides a voice, a call, a video call, a short message service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a communication processor (CP). Further, the cellular module 221 may be implemented by, for example, an SoC.

According to an embodiment, the AP 210 or the cellular module 221 (for example, a communication processor (CP)) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the Wi-Fi module 223, the BT module 225, the GNSS module 227, and the NFC module 228 may include, for example, a processor for processing data transmitted/received through the corresponding module. Although the cellular module 221, the Wi-Fi module 223, the BT module 225, the GNSS module 227, and the NFC module 228 are illustrated as blocks separate from each other in FIG. 8, at least some (for example, two or more) of the cellular module 221, the Wi-Fi module 223, the BT module 225, the GNSS module 227, and the NFC module 228 may be included in one integrated chip (IC) or one IC package according to one embodiment. For example, at least some (for example, the CP corresponding to the cellular module 221 and the Wi-Fi processor corresponding to the Wi-Fi module 223) of the processors corresponding to the cellular module 221, the Wi-Fi module 223, the BT module 225, the GNSS module 227, and the NFC module 228 may be implemented by one SoC.

The RF module 229 transmits/receives data, for example, an RF signal. Although not illustrated, the RF module 229 may include, for example, a transceiver, a power amp module (PAM), a frequency filter, a low noise amplifier (LNA) or the like. Further, the RF module 229 may further include a component for transmitting/receiving electronic waves over a free air space in wireless communication, for example, a conductor, a conducting wire, or the like. Although the cellular module 221, the Wi-Fi module 223, the BT module 225, the GNSS module 227, and the NFC module 228 share one RF module 229 in FIG. 2, at least one of the cellular module 221, the Wi-Fi module 223, the BT module 225, the GNSS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, integrated circuit card identifier (ICCID)) or subscriber information (for example, international mobile subscriber identity (IMSI).

The memory 230 (for example, memory 130) may include an internal memory 232 or an external memory 234. The internal memory 232 may include, for example, at least one of a volatile memory (for example, a random access memory (RAM), a dynamic RAM (DRAM), a static RAM (SRAM), a synchronous dynamic RAM (SDRAM), and the like), and a non-volatile Memory (for example, a read only memory (ROM), a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a solid state drive (SSD). The external memory 234 may further include a flash drive, for example, a compact flash (CF), a secure digital (SD), a micro-SD, a mini-SD, an extreme Digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, red, green, and blue (RGB) sensor) 240H, a biometric sensor 240I, a temperature/humidity sensor 240J, an illumination (light) sensor 240K, and an ultra violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 201 through an input means generating an ultrasonic signal to identify data and can perform wireless recognition. According to an embodiment, the electronic device 201 receives a user input from an external device (for example, computer or server) connected to the electronic device 201 by using the communication interface 220.

The display 260 (for example, display 160) includes a panel 262, a hologram device 264, and a projector 266. The panel 262 may be, for example, a liquid crystal display (LCD) or an active matrix organic light emitting diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a d-subminiature (D-sub) 278. The interface 270 may be included in, for example, the communication interface 170 illustrated in FIG. 1. Additionally or alternatively, the interface 270 may include, for example, a Mobile High-definition Link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an image signal processor (ISP) (not shown) or a flash (for example, an LED or xenon lamp).

The power managing module 295 manages power of the electronic device 201. Although not illustrated, the power managing module 295 may include, for example, a power management integrated circuit (PMIC), a charger IC, or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery. The indicator 297 shows particular statuses of the electronic device 201 or a part (for example, AP 210) of the electronic device 201, for example, a booting status, a message status, a charging status and the like. The motor 298 converts an electrical signal to a mechanical vibration.

Although not illustrated, the electronic device 201 may include a processing unit (for example, GPU) for supporting a module TV. The processing unit for supporting the mobile TV may process, for example, media data according to a standard of digital multimedia broadcasting (DMB), digital video broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
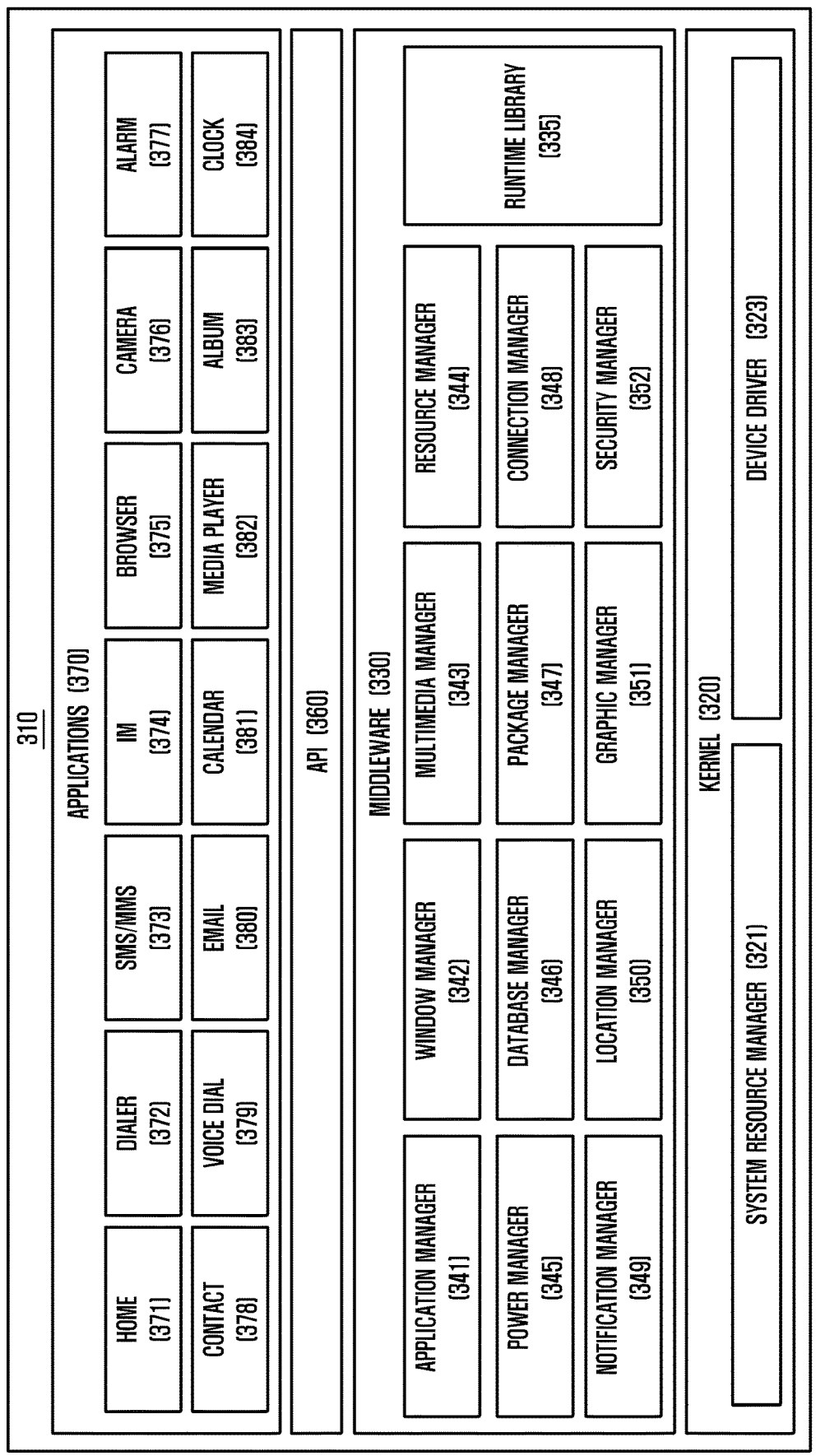
FIG. 3 is a block diagram of a program module according to various embodiments of the present disclosure.

FIG. 3 is a block diagram of a programming module 310 according to an embodiment of the present disclosure. The programming module 310 (for example, programming module 140) may be included (stored) in the electronic device 100 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 201) to include an Operating System (OS) controlling resources related to the electronic device (for example, electronic device 100) or various applications (for example, applications 370) driving on the OS. For example, the OS may be Android, iOS™, Windows™, Symbian™, Tizen™, Bada OS™ or the like. Referring to FIG. 3, the programming module 310 includes a kernel 320, a middleware 330, an Application Programming Interface (API) 360, and applications 370.

The kernel 320 (for example, kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a BT driver, a shared memory driver, a USB driver, a keypad driver, a Wi-Fi driver, and an audio driver. Further, according to an embodiment, the device driver 323 may include an inter-process communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 330 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages graphical user interface (GUI) resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a basic input/output system (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as Wi-Fi or Bluetooth (BT). The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of OS to provide a differentiated function. Further, the middleware 330 may dynamically delete some of the components of the related art or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an OS. For example, in Android™ or iOS™, a single API set may be provided for each platform. In Tizen™, two or more API sets may be provided. The applications 370, which may include an application similar to the application 147, may include, for example, a preloaded application and/or a third party application. The applications 370 may include a home application 371 a dialer application 372, a short messaging service (SMS)/multimedia messaging service (MMS) application 373, an instant messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 310, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
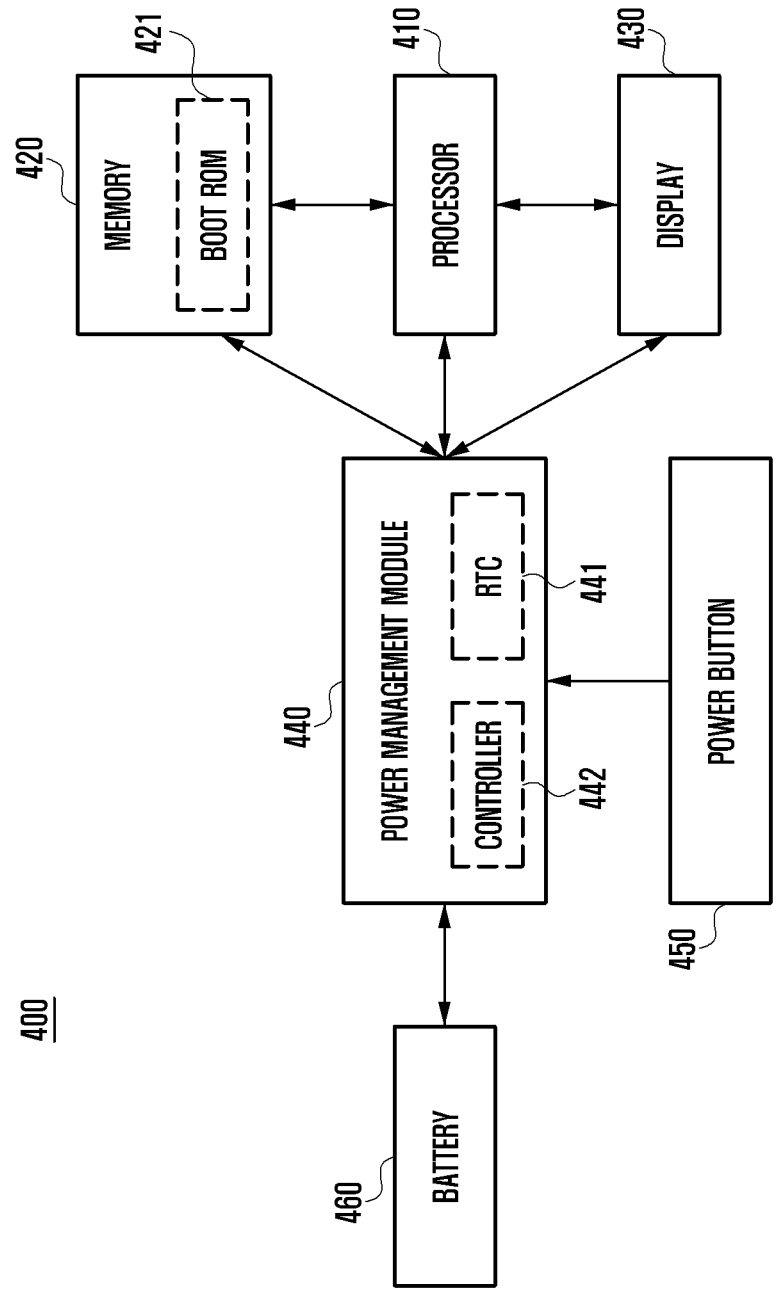
FIG. 4 is a block diagram illustrating the configuration of an electronic device according to various embodiments of the present disclosure.

FIG. 4 is a block diagram illustrating the configuration of an electronic device according to various embodiments of the present disclosure.

Referring to FIG. 4, an electronic device 400 may include a processor (e.g., processor 210 of FIG. 2 or at least one processor) 410, a memory (e.g., memory 230 of FIG. 2) 420, a display (e.g., display 260 of FIG. 2) 430, a power management module (e.g., power management module 295 of FIG. 2) 440, a power button (e.g., key 256 of FIG. 2) 450, and a battery (e.g., battery 296 of FIG. 2) 460.

According to an embodiment, the processor 410 may perform a normal booting operation. If power-on operation is performed, the electronic device 400 may execute a boot loader, and perform kernel booting after performing a board initialization process for initializing a hardware device. Thereafter, the processor 410 may load a file system into the memory (e.g., RAM) 420, and perform normal booting to load and initialize an application.

According to an embodiment, the memory 420 may include a volatile memory (e.g., RAM) or a nonvolatile memory (e.g., ROM or eMMC), and a boot ROM 421 may be stored in the nonvolatile memory.

According to an embodiment, if the normal booting operation is completed, the processor may perform an operation according to the function of the electronic device 400. The operation according to the function of the electronic device 400 may be a typical operation to perform the function of the electronic device 400, such as execution of an application of the electronic device 400, for example, based on the input of the user.

According to an embodiment, the processor 410 may determine whether the power level is equal to or lower than a specific level (e.g., first power level). For example, the processor 410 or the power management module 440 (e.g., power management module 295 of FIG. 2) of the electronic device 400 may have a preset power level of the battery (e.g., battery 296 of FIG. 2) 460, or may sense whether the power level is equal to or lower than the specific level (e.g., first power level) set by a user.

According to an embodiment, if the processor 410 or the power management module 440 (e.g., power management module 295 of FIG. 2) of the electronic device 400 determines that the power level of the battery (e.g., battery 296 of FIG. 2) 460 is preset or the power level is equal to or lower than the specific level (e.g., first power level) set by the user, the electronic device 400 may notify a platform (e.g., framework) of a system or an operating system (OS) of the power level of the electronic device 400 under the control of the processor 410. The specific level (e.g., first power level) may be a ratio of the current amount of power to the total amount of battery power (e.g., mAh). For example, the specific level (e.g., first power level) may be equal to or lower than 2% of the total amount of power of the battery (e.g., battery 296 of FIG. 2) 460.

According to an embodiment, if it is determined that the power level is equal to or lower than the specific level (e.g., first power level), the processor 410 may create a power-off command and a reboot command through the platform. The power-off command and the reboot command transferred from the platform are transferred to the kernel and the boot loader to end the processor 410, and the processor 410 and a sensor (e.g., sensor module 240 of FIG. 2) may enter into a power-off state. According to an embodiment, if it is determined that the power level is equal to or lower than the specific level (e.g., first power level), the processor 410 may display a message about the battery state on the display 430. For example, the message about the battery state that is displayed on the display 430 may be "The battery is too low. All functions are ended, and only a basic clock function can be used for a long time."

According to an embodiment, if it is determined that the power level is equal to or lower than the specific level (e.g., first power level), the processor 410 may display a message about the battery state on the display 430, and may inquire of a user whether to enter into a power-off mode.

According to an embodiment, the processor 410 may transfer the power-off command and the reboot command to the boot loader of the boot ROM 421. If the power-off command and the reboot command are transferred to the boot loader of the boot ROM 421, the power of the boot loader may be turned off, and a power-off flag may be set. The power-off flag may be an indicator for indicating that the electronic device 400 is in a power-off state. The processor 410 may display an animation about the power-off on the display 430 before entering into the power-off state.

According to an embodiment, the electronic device 400 may determine whether an event occurs in the power-off state.

According to an embodiment, if it is determined that the event corresponds to a first input, a controller 442 included in the power management module 440 may control the boot loader included in the boot ROM 421 to display time related information on the display 430 for a predetermined time. The power management module 440 may include a real time clock (RTC) 441 to provide the time related information, and the power management module 440 may control the RTC 441 to provide time information to the boot loader. For example, the predetermined time may be several seconds (e.g., 1-3 seconds) or less, and the time related information may be a text or an image related to the current time. According to an embodiment, the first input may be an input through user's pressing of the power button (or key) 450. The first input may correspond to user's short pressing of the power button (or key) 450.

According to an embodiment, if it is determined that the first input is made, the power management module (e.g., power management module 295 of FIG. 2) may operate to supply the power to the memory 420. The controller 442 included in the power management module 440 may determine whether to execute booting through reading of the boot loader from the boot ROM 421. In this case, since the power-off flag is set in the boot loader, the boot loader may not perform the normal booting command of the electronic device 400, but may read the stored time information to display the time information and the time related information on the display 430.

According to an embodiment, if it is determined that the first input is made, the power management module (e.g., power management module 295 of FIG. 2) may supply the power to the memory 420. The controller 442 included in the power management module 440 may check the power-off flag set in the boot loader. If the power-off flag is set in the boot loader, the controller 442 may not turn on the power of the processor 410, but may control the boot loader to display the time information and the time related information on the display 430.

According to an embodiment, the processor 410 may determine whether the event occurred corresponds to a second input or a charging event. If the electronic device 400 is in a low power state, a user may replace the battery (e.g., battery 296 of FIG. 2) 460 of the electronic device 400, and may press the power button (or key) 450. In this case, if long pressing of the power button (or key) 450 is performed, unlike the first input, the processor 410 may recognize this as the second input to perform the normal booting command. If the power management module (e.g., power management module 295 of FIG. 2) transfers the second input to the processor 410, the boot loader included in the processor 410 may remove the power-off flag setting to enter into the normal booting operation.

According to various embodiments, if the electronic device 400 is in a low power state, the user may replace the battery (e.g., battery 296 of FIG. 2) 460 of the electronic device 400 and may reset the power-off flag. In this case, if the long pressing of the power button (or key) 450 is performed, unlike the first input, the power management module 440 may recognize this as the second input to make the processor 410 perform the normal booting command. The replaced battery (e.g., battery 296 of FIG. 2) 460 may include the power having a predetermined level or more.

As another example, if the electronic device 400 is in a low power state, the user may perform charging of the electronic device 400. If the power level of the battery (e.g., battery 296 of FIG. 2) 460 is equal to or higher than a specific level (e.g., second power level) after the charging operation, the processor 410 may perform the normal booting operation. The specific level (e.g., second power level) may be a ratio of the current amount of power to the total amount of power (e.g., mAh). For example, the specific level may be 5% or more of the total amount of power of the battery (e.g., battery 296 of FIG. 2) 460. If the event occurred corresponds to the second input or the charging event, the processor 410 may display an animation about the charging event or an animation about power-on. The memory 430 may store an operating system (OS) or an application that is necessary for booting or operating of the electronic device 400.

According to an embodiment, an electronic device 400 may include a memory 420 including a boot ROM storing a boot loader therein, a power management module 440, a power button 450 configured to transfer a user input to the power management module, a processor 410, and the display 430, wherein the processor 410 transfers a power-off command and a reboot command to the electronic device and sets a power-off flag in the boot loader if the power level of a battery is equal to or lower than a first level, the electronic device 400 enters into a power-off state, and the power management module 440 controls the boot loader to display on the display 430 current time related information for a predetermined time if an event occurs in the power-off state.

According to an embodiment, if the power level is equal to or lower than the first level, the processor 410 may operate to display a message about the power state on the display 430.

According to an embodiment, if the processor 410 enters into the power-off state, it may operate to display an animation about the power-off on the display 430.

According to an embodiment, the event may correspond to a first input through pressing of the power button.

According to an embodiment, the processor 410 may transfer the power-off command and the reboot command to the boot loader and a kernel region.

According to an embodiment, if it is determined that the event corresponds to a second input through pressing of the power button or a charging event, the power management module 440 may control the memory 420 to perform normal booting with respect to the processor 410.

According to an embodiment, if it is determined that the event is the charging event, the processor 410 may operate to display an animation about a charging state on the display 430.

According to an embodiment, if it is determined that the event corresponds to the second input, the processor 410 may operate to display an animation about the power-on on the display 430.

According to an embodiment, if the processor 410 enters into the power-off state, it may operate to store time information and clock image information in the boot loader.

According to an embodiment, the power management module 440 may control the boot loader to generate a clock image through synthesis of the time information and the clock image information.

Figure 5:
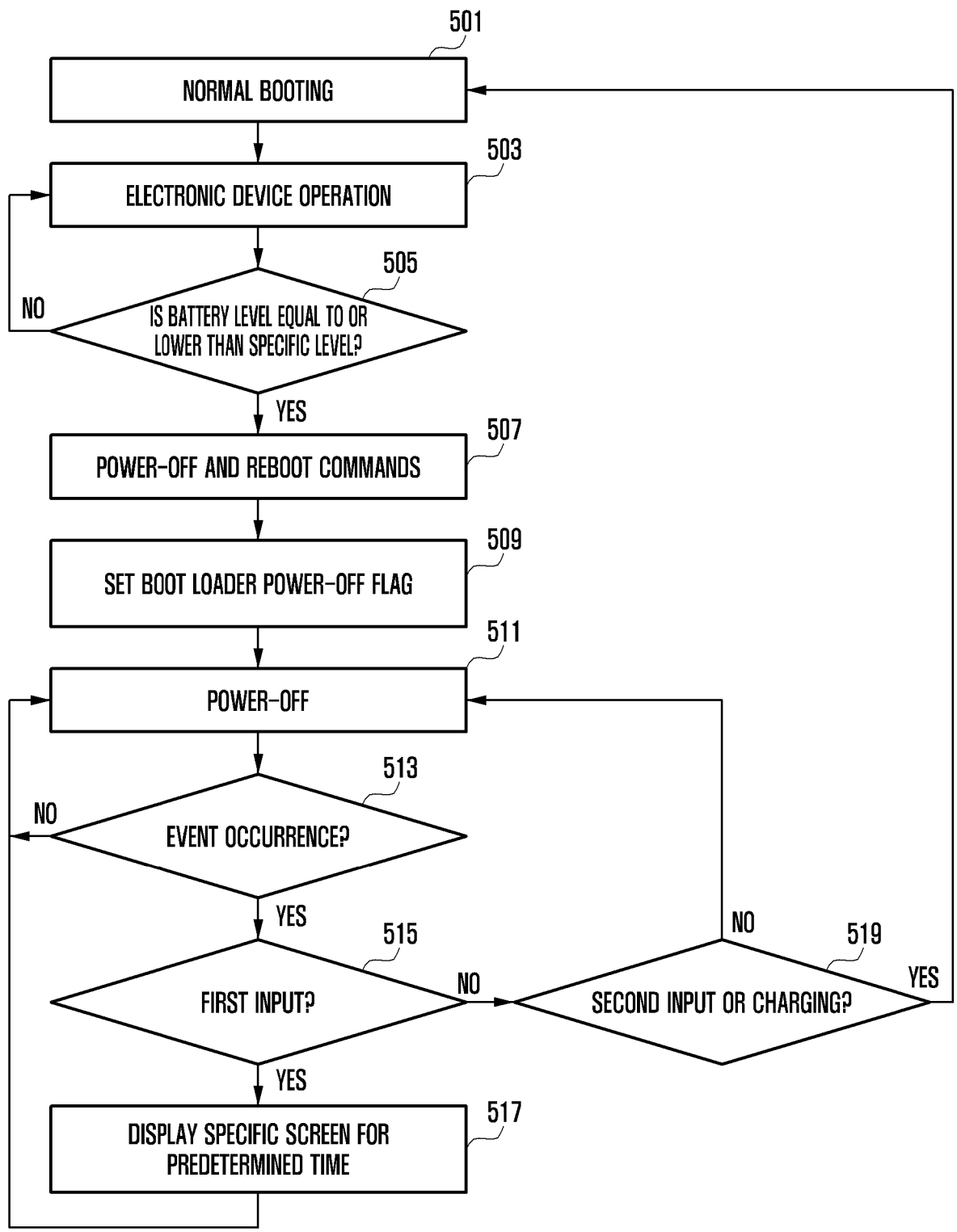
FIG. 5 is a flow chart illustrating a method for controlling an electronic device in a low power state according to various embodiments of the present disclosure.

FIG. 5 is a flow chart illustrating a method for controlling an electronic device in a low power state according to various embodiments of the present disclosure.

Referring to FIG. 5, at operation 501, an electronic device (e.g., electronic device 400) may perform a normal booting operation. If power-on operation is performed, the electronic device 400 may execute a boot loader, and perform kernel booting after performing a board initialization process for initializing a hardware device. The power-on operation of the electronic device 400 may be, for example, an operation in which if a user presses a power button (or key) 450 of the electronic device 400 in a state where the electronic device 400 is in an off state, this is recognized as an input for performing turn-on (or power-on) of the electronic device 400.

According to an embodiment, if the normal booting operation is completed, the electronic device 400, at operation 503, may perform an operation according to the function of the electronic device 400. The operation according to the function of the electronic device 400 may be, for example, a typical operation to perform the function of the electronic device 400, such as execution of an application of the electronic device 400.

According to an embodiment, at operation 505, the electronic device 400 may determine whether the power level is equal to or lower than a specific level (e.g., first power level). The processor 410 or the power management module (e.g., power management module 295 of FIG. 2) of the electronic device 400 may sense whether the power level of the battery (e.g., battery 296 of FIG. 2) 460 is equal to or lower than the specific level (e.g., first power level) that is preset or set by the user. If the processor 410 or the power management module (e.g., power management module 295 of FIG. 2) of the electronic device 400 determines that the power level of the battery (e.g., battery 296 of FIG. 2) 460 is equal to or lower than the specific level (e.g., first power level) that is preset or set by the user, the electronic device 400 may notify a platform (e.g., framework) of a system or an operating system (OS) of the power level of the electronic device 400 under the control of the processor 410. The specific level (e.g., first power level) may be a ratio of the current amount of power to the total amount of power (e.g., mAh) of the battery (e.g., battery 296 of FIG. 2) 460. For example, the specific level (e.g., first power level) may be equal to or lower than 2% of the total amount of power of the battery (e.g., battery 296 of FIG. 2) 460.

According to an embodiment, at operation 505, if it is determined that the power level is equal to or higher than the specific level, the electronic device 400 may move to operation 503.

According to an embodiment, at operation 505, if it is determined that the power level is equal to or lower than the specific level, the electronic device 400 may move to operation 507.

According to an embodiment, at operation 507, if it is determined that the power level is equal to or lower than the specific level (e.g., first power level), the electronic device 400 may create a power-off command and a reboot command through the platform. The power-off command and the reboot command transferred from the platform are transferred to the kernel and the boot loader to end the process, and the electronic device 400 and a sensor (e.g., sensor module 240 of FIG. 2) may enter into a power-off state. According to an embodiment, if it is determined that the power level is equal to or lower than the specific level (e.g., first power level), the electronic device 400 may display a message about the battery state on the display 430 to notify a user of the state information of the electronic device 400 or to request an input (or confirmation) from the user. For example, the message about the battery state that is displayed on the display 430 may be "The battery is too low. All functions are ended, and only a basic clock function can be used for a long time."

According to an embodiment, if the power-off command and the reboot command are transferred to the boot loader, the electronic device 400, at operation 509, may turn off the power of the boot loader, and may set a power-off flag. The power-off flag may be an indicator for indicating that the electronic device 400 is in a power-off state.

According to an embodiment, at operation 511, the electronic device 400 may transfer the power-off command and the reboot command transferred from the platform to the kernel and the boot loader to end the process, and may make the processor 410 and the sensor (e.g., sensor module 240 of FIG. 2) enter into the power-off state.

According to an embodiment, at operation 511, the electronic device 400 may display an animation about the power-off before entering into the power-off state.

According to an embodiment, the electronic device 400, at operation 513, may determine whether an event occurs.

According to an embodiment, if the event does not occur at operation 513, the electronic device 400 may move to operation 511.

According to an embodiment, if the event occurs at operation 513, the electronic device 400 may move to operation 515.

According to an embodiment, at operation 515, the electronic device 400 may determine whether the event occurred corresponds to a first input. The first input may be, for example, an input that is generated by the electronic device 400 if the user presses the power button (or key) 450. The power management module 440 input through the power button (or key) 450 may determine whether the event occurred corresponds to the first input. The power management module 440 may supply the power to the memory 420 through the controller 442, and may determine whether a power-off flag is set in the boot loader. If it is determined that the power-off flag is set in the boot loader, the power management module 440 may move to operation 517.

According to an embodiment, at operation 515, the first input may be an input through user's pressing of the power button (or key) 450. For example, the first input may correspond to user's short pressing of the power button (or key) 450.

According to an embodiment, at operation 517, the electronic device 400 may display time related information on the display 430 for a predetermined time. According to an embodiment, if it is determined that the event occurred corresponds to a first input at operation 515, the power management module 440 may control an RTC 441 to provide current time information to the boot loader, and the boot loader may generate the time related information through synthesis of the current time information and stored clock image information. The generated time related information may be displayed on the display 430 under the control of the power management module 440, for example, the controller 442. In various embodiments, not only the RTC 441 may supply the time information to the boot loader but also the boot loader itself may store the time information therein. For example, the predetermined time may be several seconds (e.g., 1-3 seconds) or less, and the time related information that is displayed on the display 430 may be a text or an image related to the current time.

According to an embodiment, if the electronic device 400 determines that the first input is made at operation 515, the power management module (e.g., power management module 295 of FIG. 2) 440 may supply the power to the memory 420. The power management module 440 may determine whether to execute booting through reading of the boot loader from a boot ROM 421. In this case, since the power-off flag is set in the boot loader at operation 509, the boot loader, at operation 517, may not perform the normal booting command of the electronic device 400, but may read the time information included in the boot loader to display the time related information on the display 430.

According to an embodiment, at operation 517, the power management module (e.g., power management module 295 of FIG. 2) 440 of the electronic device 400 may supply the power to the memory 420. The power management module 440 may determine whether to execute booting through reading of the boot loader from the boot ROM 421. In this case, since the power-off flag is set in the boot loader at operation 509, the boot loader, at operation 517, may not perform the normal booting command of the electronic device 400, but may read the stored time information through accessing a parameter partition to display the time information on the display 430 under the control of a clock controller included in the boot loader.

According to an embodiment, the electronic device 400 may display the time related information for the predetermined time at operation 517, and then may move to operation 511.

According to an embodiment, if it is determined that the event occurred does not correspond to the first input at operation 515, the electronic device 400 may move to operation 519.

According to an embodiment, at operation 519, the electronic device 400 may determine whether the event occurred corresponds to a second input or a charging event. If the electronic device 400 is in a low power state, a user may replace the battery (e.g., battery 296 of FIG. 2) 460 of the electronic device 400, and may press the power button (or key) 450. In this case, if long pressing of the power button (or key) 450 is performed, unlike the first input, the electronic device 400 may recognize this as the second input to perform the normal booting operation. The power management module (e.g., power management module 295 of FIG. 2) may transfer the second input to the processor 410, and the processor 410 may perform the normal booting operation. According to an embodiment, during the normal booting operation, the power-off flag setting in the boot loader may be removed (or reset).

According to various embodiments, although the electronic device 400 is in a low power state, the user may perform long pressing of the power button (or key) 450 in a power-off state. In this case, the power management module 440 may recognize the long pressing input as the second input to enable the processor 410 to perform the normal booting command. It is disclosed that the first input corresponds to the short pressing and the second input corresponds to the long pressing, but are not limited thereto. In various embodiments, the first input may be replaced by the long pressing, and the second input may be replaced by the short pressing. Further, the first input and the second input may differ from each other in the number of times of inputs. The first input and the second input may be related to operations of pressing the power button 450, and may differ from each other in input time and/or the number of times of inputs. The first input may be an input for displaying the time related information on the display 430 in the power-off state, and the second input may be an input for proceeding with the normal booting in the power-off state of the electronic device 400.

According to an embodiment, if the electronic device 400 is in a low power state (e.g., power-off state), the user may perform charging of the electronic device 400. If the power level of the battery (e.g., battery 296 of FIG. 2) 460 is equal to or higher than a specific level (e.g., second power level) after the charging operation, the electronic device 400 may perform the normal booting operation. The specific level (e.g., second power level) may be a ratio of the current amount of power to the total amount of power (e.g., mAh). For example, the specific level may be 5% or more of the total amount of power of the battery (e.g., battery 296 of FIG. 2) 460. If the event occurred corresponds to the second input or the charging event, the electronic device 400 may display an animation about the charging event or an animation about the power-on, and then moves to operation 501 to perform the normal booting operation.

As another example, if the power level of the battery (e.g., battery 296 of FIG. 2) 460 is equal to or higher than a specific level (e.g., second power level) after performing the charging operation under the control of the controller 442, the power management module 440 may perform the normal booting command. If the normal booting is performed, the power management module 440 may supply the power to the processor 410, and the processor 410 that has received the supplied power may perform the normal booting. The specific level (e.g., second power level) may be a ratio of the current amount of power to the total amount of power (e.g., mAh). For example, the specific level may be 5% or more of the total amount of power of the battery (e.g., battery 296 of FIG. 2) 460. If the event occurred corresponds to the second input or the charging event, the electronic device 400 may display an animation about the charging event or an animation about the power-on, and then moves to operation 501 to perform the normal booting operation.

The specific power level (e.g., second power level) at operation 519 may be higher than the specific power level (e.g., first power level) at operation 505.

If the event occurred does not correspond to the second input or the charging event at operation 519, the electronic device 400 may move to operation 511.

According to various embodiments, if the event occurred does not correspond to the second input or the charging event at operation 519, the controller 442 of the power management module 440 may move to operation 511.

If the event occurred corresponds to the second input or the charging event at operation 519, the electronic device 400 may move to operation 501.

According to various embodiments, if the event occurred corresponds to the second input or the charging event at operation 519, the controller 442 of the power management module 440 may move to operation 501.

Figure 6:
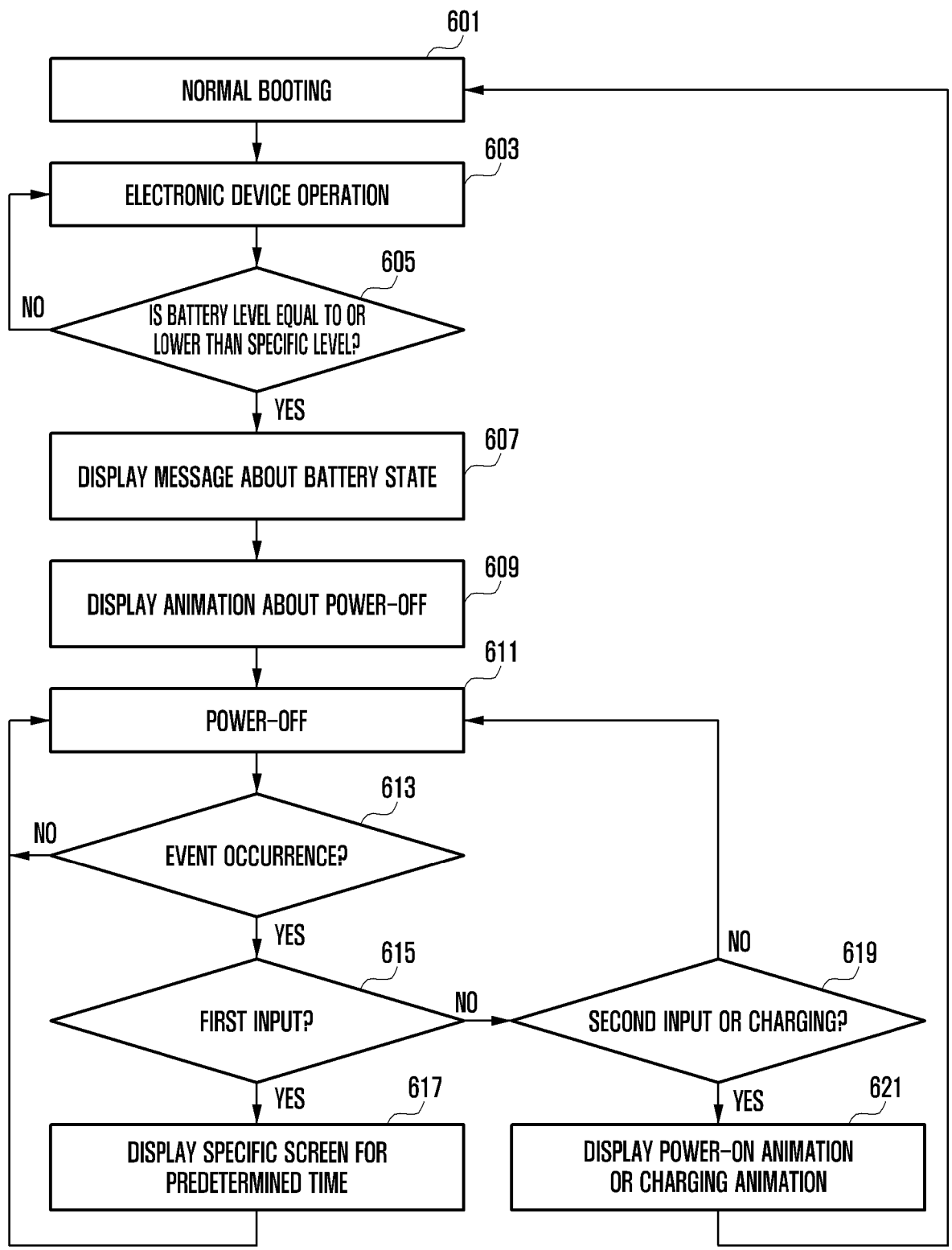
FIG. 6 is a flowchart illustrating a method for displaying time information of an electronic device in a low power state according to various embodiments of the present disclosure.

FIG. 6 is a flowchart illustrating a method for displaying time information of an electronic device in a low power state according to various embodiments of the present disclosure.

Referring to FIG. 6, at operation 601, an electronic device (e.g., electronic device 400) may perform a normal booting operation. If power-on operation is performed, the electronic device 400 may execute a boot loader, and perform kernel booting after performing a board initialization process for initializing a hardware device. The power-on operation of the electronic device 400 may be, for example, an operation in which if a user presses a power button (or key) 450 of the electronic device 400 in a state where the electronic device 400 is in an off state, this is recognized as an input for performing turn-on (or power-on) of the electronic device 400.

According to an embodiment, if the normal booting operation is completed, the electronic device 400, at operation 603, may perform an operation according to the function of the electronic device 400. The operation according to the function of the electronic device 400 may be, for example, a typical operation to perform the function of the electronic device 400, such as execution of an application of the electronic device 400.

According to an embodiment, at operation 605, the electronic device 400 or the power management module 440 may determine whether the power level is equal to or lower than a specific level (e.g., first power level). The processor 410 or the power management module (e.g., power management module 295 of FIG. 2) of the electronic device 400 may sense whether the power level of the battery (e.g., battery 296 of FIG. 2) 460 is equal to or lower than a preset specific level (e.g., first power level). If the processor 410 or the power management module (e.g., power management module 295 of FIG. 2) of the electronic device 400 determines that the power level of the battery (e.g., battery 296 of FIG. 2) 460 is equal to or lower than the preset specific level (e.g., first power level), the electronic device 400 may notify a platform (e.g., framework) of a system or an operating system (OS) of the power level of the electronic device 400 under the control of the processor 410. The specific level (e.g., first power level) may be a ratio of the current amount of power to the total amount of power (e.g., mAh) of the battery. For example, the specific level (e.g., first power level) may be equal to or lower than 2% of the total amount of power of the battery (e.g., battery 296 of FIG. 2) 460.

According to an embodiment, at operation 605, if it is determined that the power level is equal to or higher than the specific level, the electronic device 400 may move to operation 603.

According to an embodiment, at operation 605, if it is determined that the power level is equal to or lower than the specific level, the electronic device 400 may move to operation 607.

According to an embodiment, if it is determined that the power level is equal to or lower than the specific level (e.g., first power level), the electronic device 400, at operation 607, may display a message about the state of the battery (e.g., battery 296 of FIG. 2) 460 on the display 430 to notify a user of the state information of the electronic device 400 or to request an input (or confirmation) from the user. For example, the message about the battery state that is displayed on the display 430 may be "The battery is too low. All functions are ended, and only a basic clock function can be used for a long time."

According to an embodiment, at operation 609, the electronic device 400 may display an animation about the power-off after displaying the message about the message state on the display 430. For example, the animation about the power-off may be a logo of a manufacturer and/or a product.

According to an embodiment, at operation 611, the electronic device 400 may transfer the power-off command and the reboot command transferred from the platform to the kernel and the boot loader to end the process, and may make the processor 410 and the sensor (e.g., sensor module 240 of FIG. 2) enter into the power-off state.

According to an embodiment, the electronic device 400, at operation 613, may determine whether an event occurs.

According to an embodiment, if the event does not occur at operation 613, the electronic device 400 may move to operation 611.

According to an embodiment, if the event occurs at operation 613, the electronic device 400 may move to operation 615.

According to an embodiment, at operation 615, the electronic device 400 may determine whether the event occurred corresponds to a first input. The first input may be, for example, an input that is generated by the electronic device 400 if the user presses the power button (or key) 450. The power management module 440 input through the power button (or key) 450 may determine whether the event occurred corresponds to the first input. The power management module 440 may supply the power to the memory 420 through the controller 442, and may determine whether a power-off flag is set in the boot loader. If it is determined that the power-off flag is set in the boot loader, the power management module 440 may move to operation 617. According to an embodiment, if it is determined that the event occurred corresponds to the first input at operation 615, the electronic device 400 may move to operation 617.

According to an embodiment, at operation 615, the first input may be an input through user's pressing of the power button (or key) 450. For example, the first input may correspond to user's short pressing of the power button (or key) 450.

According to an embodiment, at operation 617, the electronic device 400 may display time related information on the display 430 for a predetermined time. According to an embodiment, at operation 617, the power management module 440 may control an RTC 441 to provide current time information to the boot loader, and the boot loader may generate the time related information through synthesis of the current time information and stored clock image information. The generated time related information may be displayed on the display 430 under the control of the power management module 440, for example, the controller 442. In various embodiments, not only the RTC 441 may supply the time information to the boot loader but also the boot loader itself may store the time information therein. For example, the predetermined time may be several seconds (e.g., 1-3 seconds) or less, and the time related information that is displayed on the display 430 may be a text or an image related to the current time.

According to an embodiment, at operation 617, the power management module (e.g., power management module 295 of FIG. 2) 440 may supply the power to the memory 420. The power management module 440 may determine whether to execute booting through reading of the boot loader from a boot ROM 421. In this case, since the power-off flag is set in the boot loader, the boot loader, at operation 617, may not perform the normal booting command of the electronic device 400, but may read the time information included in the boot loader to display the time related information on the display 430.

According to an embodiment, at operation 617, the power management module (e.g., power management module 295 of FIG. 2) 440 of the electronic device 400 may supply the power to the memory 420. The power management module 440 may determine whether to execute booting through reading of the boot loader from the boot ROM 421. In this case, since the power-off flag is set in the boot loader, the boot loader, at operation 617, may not perform the normal booting command of the electronic device 400, but may read the stored time information through accessing a parameter partition to display the time information on the display 430 under the control of a clock controller included in the boot loader.

According to an embodiment, the electronic device 400 may display the time related information for the predetermined time at operation 617, and then may move to operation 611.

According to an embodiment, if it is determined that the event occurred does not correspond to the first input at operation 615, the electronic device 400 may move to operation 619.

According to an embodiment, at operation 619, the electronic device 400 may determine whether the event occurred corresponds to a second input or a charging event. If the electronic device 400 is in a low power state, a user may replace the battery (e.g., battery 296 of FIG. 2) 460 of the electronic device 400, and may press the power button (or key) 450. In this case, if long pressing of the power button (or key) 450 is performed, unlike the first input, the electronic device 400 may recognize this as the second input to perform the normal booting command.

According to various embodiments, although the electronic device 400 is in a low power state, the user may perform long pressing of the power button (or key) 450 in a power-off state. In this case, the power management module 440 may recognize the long pressing input as the second input to enable the processor 410 to perform the normal booting command.

Further, if the electronic device 400 is in a low power state, the user may perform charging of the electronic device 400. If the power level of the battery (e.g., battery 296 of FIG. 2) 460 is equal to or higher than a specific level (e.g., second power level) after the charging operation, the electronic device 400 may perform the normal booting operation. The specific level (e.g., second power level) may be a ratio of the current amount of power to the total amount of power (e.g., mAh). For example, the specific level may be 5% or more of the total amount of power of the battery.

The specific power level (e.g., second power level) at operation 619 may be higher than the specific power level (e.g., first power level) at operation 505.

According to an embodiment, if the event occurred does not correspond to the second input or the charging event at operation 619, the electronic device 400 may move to operation 611.

According to various embodiments, if the event occurred does not correspond to the second input or the charging event at operation 619, the controller 442 of the power management module 440 may move to operation 611.

According to an embodiment, if the event occurred corresponds to the second input or the charging event at operation 619, the electronic device 400 may move to operation 621.

According to various embodiments, if the event occurred corresponds to the second input or the charging event at operation 619, the controller 442 of the power management module 440 may move to operation 621.

According to an embodiment, if the event occurred corresponds to the second input or the charging event, the electronic device 400, at operation 621, may display an animation about the charging event, or may move to operation 601 to perform the normal booting command after displaying an animation about the power-on.

The animation about the charging event may be to display the currently charging power level. If the power level of the battery (e.g., battery 296 of FIG. 2) 460 is equal to or higher than the specific level (e.g., second power level) during the charging operation, the electronic device 400 may perform the normal booting command. The specific level (e.g., second power level) may be a ratio of the current amount of power to the total amount of power (e.g., mAh). For example, the specific level may be 5% or more of the total amount of power of the battery. In this case, the normal booting command may be performed after switching is performed from the animation about the charging event to the animation about the power-on.

According to an embodiment, a method for displaying time information in an electronic device 400 in a low power state may include transferring a power-off command and a reboot command to the electronic device 400 if a power level of a battery (e.g., battery 296 of FIG. 2) is equal to or lower than a first level, setting a power-off flag in a boot loader, entering into a power-off state, and displaying on a display current time related information for a predetermined time under the control of the boot loader if an event occurs in the power-off state.

According to an embodiment, the method may further include displaying a message about a power state on the display 430 under the control of a processor 410 if a power level is equal to or lower than the first level.

According to an embodiment, the method may further include displaying an animation about the power-off on the display 430 under the control of the processor 410 if the processor enters into the power-off state.

According to an embodiment, transferring the power-off command and the reboot command may be transferring the power-off command and the reboot command to the boot loader and a kernel region.

According to an embodiment, the method may further include performing normal booting of the electronic device 400 if it is determined that the event corresponds to a second input through pressing of the power button or a charging event.

According to an embodiment, if it is determined that the event is the charging event, the processor 410 may operate to display an animation about a charging state on the display 430.

According to an embodiment, the method may further include displaying an animation about a charging state under the control of the processor 410 if it is determined that the event corresponds to the charging event.

According to an embodiment, the method may further include displaying an animation about a power-on under the control of the processor 410 if it is determined that the event corresponds to the second input.

According to an embodiment, entering into the power-off state may further include storing time information and clock image information in the boot loader.

According to an embodiment, displaying the current time related information may include generating a clock image through synthesis of the time information and the clock image information under the control of the boot loader.

Figure 7:
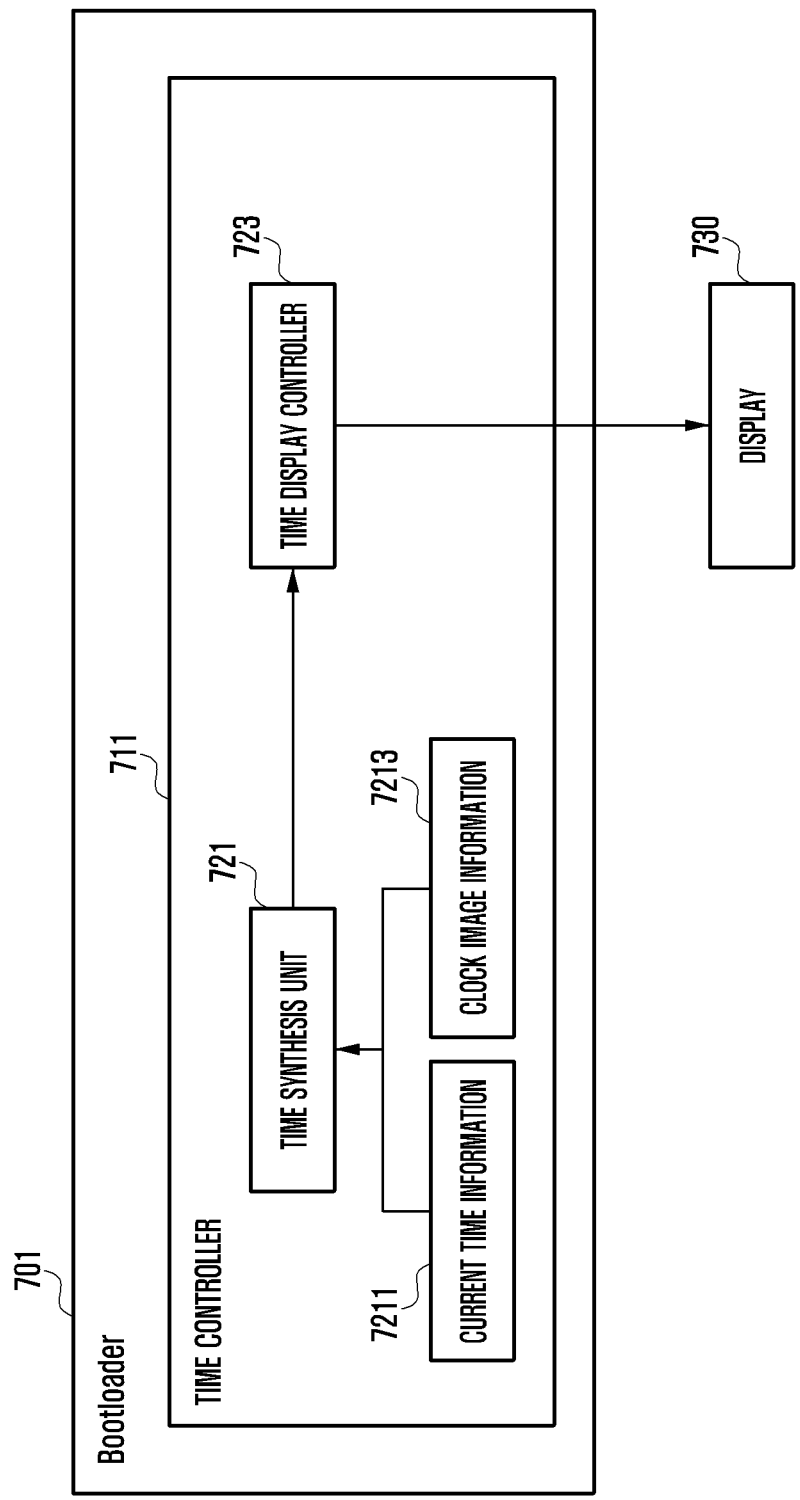
FIG. 7 is a block diagram illustrating the configuration of a boot loader according to various embodiments of the present disclosure.

FIG. 7 is a block diagram illustrating the configuration of a boot loader according to various embodiments of the present disclosure.

Referring to FIG. 7, a boot loader 701 may include a clock or time controller 711. The time controller 711 may include a time synthesis unit 721 and a time display controller 723.

According to an embodiment, if a power of an electronic device 400 is turned off in a low power state, a power-off flag may be set in the boot loader 701. In this case, if a first input is received from a power management module (e.g., power management module 295 of FIG. 2), the electronic device 400 may display time information on a display (e.g., display 430) 730 under the control of the time controller 711.

According to an embodiment, the time controller 711 may pre-store therein current time information and clock image information, or may read them from a parameter partition. The time synthesis unit or device 721 of the time controller 711 may synthesize the current time information 7211 and the clock image information 7213 to transfer the synthesized information to the time display controller 723. The current time information and the clock image information may be information pre-stored before the power-off. The clock image information may be a clock background image to be displayed on the display 730, and may be, for example, a digital type or analog type clock image. The clock image may include, for example, a background image and/or an image about the hands.

According to an embodiment, the time display controller 723 may operate to display on the display 730 time related information obtained by synthesizing the time information and the clock image.

Figure 8:
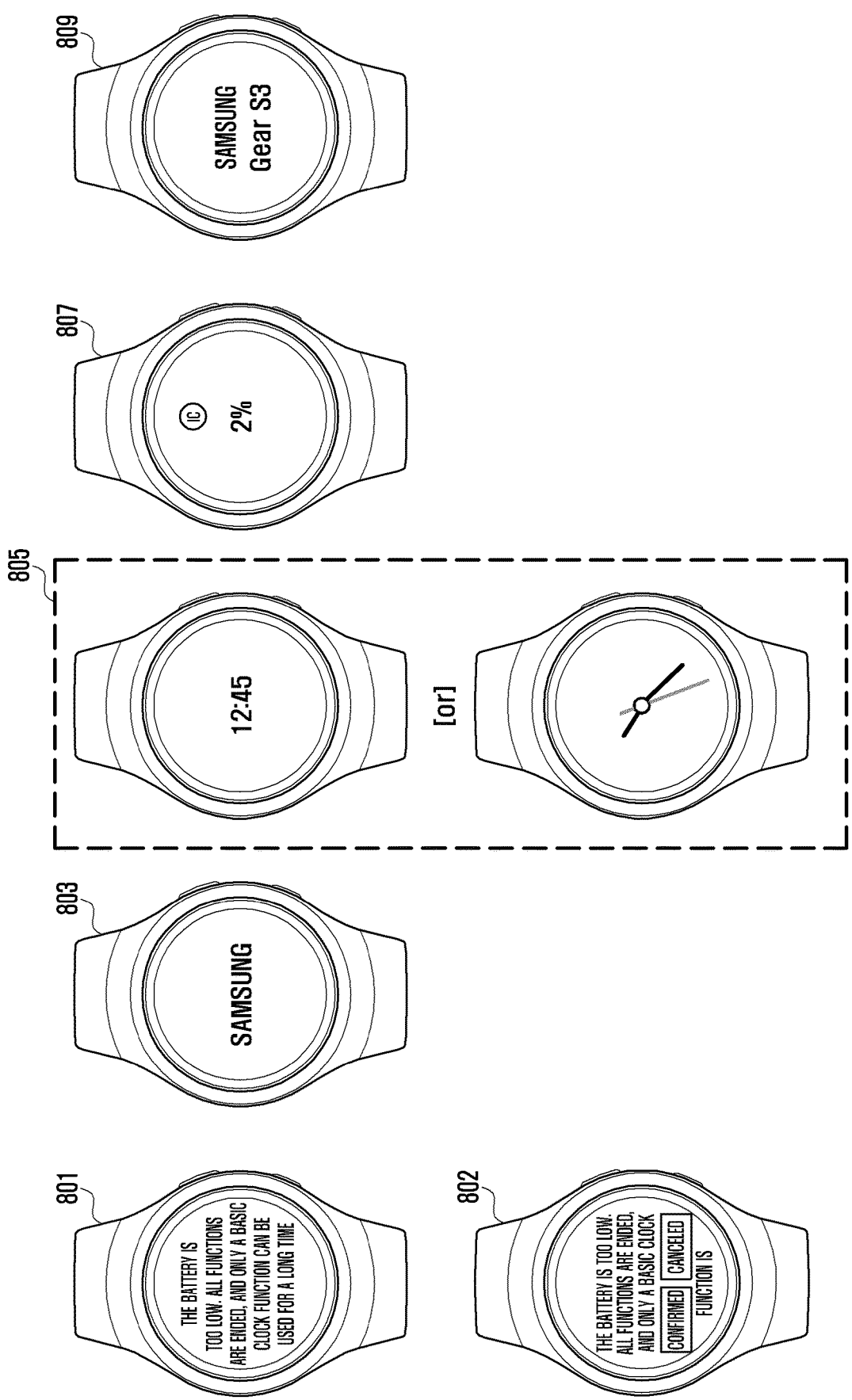
FIG. 8 is a diagram explaining a user interface of an electronic device in a low power state according to various embodiments of the present disclosure.

FIG. 8 is a diagram explaining a user interface of an electronic device in a low power state according to various embodiments of the present disclosure.

Referring to FIG. 8, on screen 801, if it is determined that a power level is equal to or lower than a specific level (e.g., first power level), an electronic device (e.g., electronic device 400) may display a message about the state of the battery (e.g., battery 296 of FIG. 2) 460 on the display 430. For example, the message about the battery state that is displayed on the display 430 may be "The battery is too low. All functions are ended, and only a basic clock function can be used for a long time."

According to an embodiment, on screen 802, if it is determined that the power level is equal to or lower than the specific level (e.g., first power level), an electronic device (e.g., electronic device 400) may display a message about the state of the battery on the display 430 to notify a user of state information of the electronic device 400 or to request an input (or confirmation) from the user. For example, the message about the battery state that is displayed on the display 430 may be "Confirm/Cancel" message together with "The battery is too low. All functions are ended, and only a basic clock function can be used for a long time." If the user presses a "Confirm" button, the electronic device may enter into a power-off mode, and otherwise, it may not enter into the power-off mode.

According to an embodiment, on screen 803, the electronic device 400 may display an animation about the power-off after displaying a message about the battery state on the display 430. For example, the animation about the power-off may be a logo of a manufacturer and/or a product.

According to an embodiment, on screen 805, the electronic device 400 may determine whether the event occurred in the power-off state corresponds to the first input. The first input may be an input that is generated from the electronic device 400 through user's pressing of the power button (or key) 450. The first input may correspond to user's short pressing of the power button (or key) 450. If it is determined that the event occurred corresponds to the first input, the electronic device 400 may display time related information for a predetermined time. The time related information may be a digital type or an analog type clock image. The electronic device 400 may display the current time on the display (e.g., display 430) in accordance with the first input.

According to an embodiment, on screen 807, if the event that occurs in the power-off state is a charging event, the electronic device may display an animation about the charging event. The animation about the charging event may be display of information on currently being charged and information on the power level.

According to an embodiment, on screen 809, if it is determined that the power level of the battery (e.g., battery 296 of FIG. 2) 460 is equal to or higher than a specific level (e.g., second power level) during a charging operation, or it is determined that the second input is generated, an animation about the power-on may be displayed. The animation about the power-on may be a logo of a manufacturer and/or a product.

For example, the specific level (e.g., second power level) may be 5% or more of the total amount of power of the battery. In this case, the normal booting command may be performed after switching is performed from the animation about the charging event to the animation about the power-on.

Figure 9:
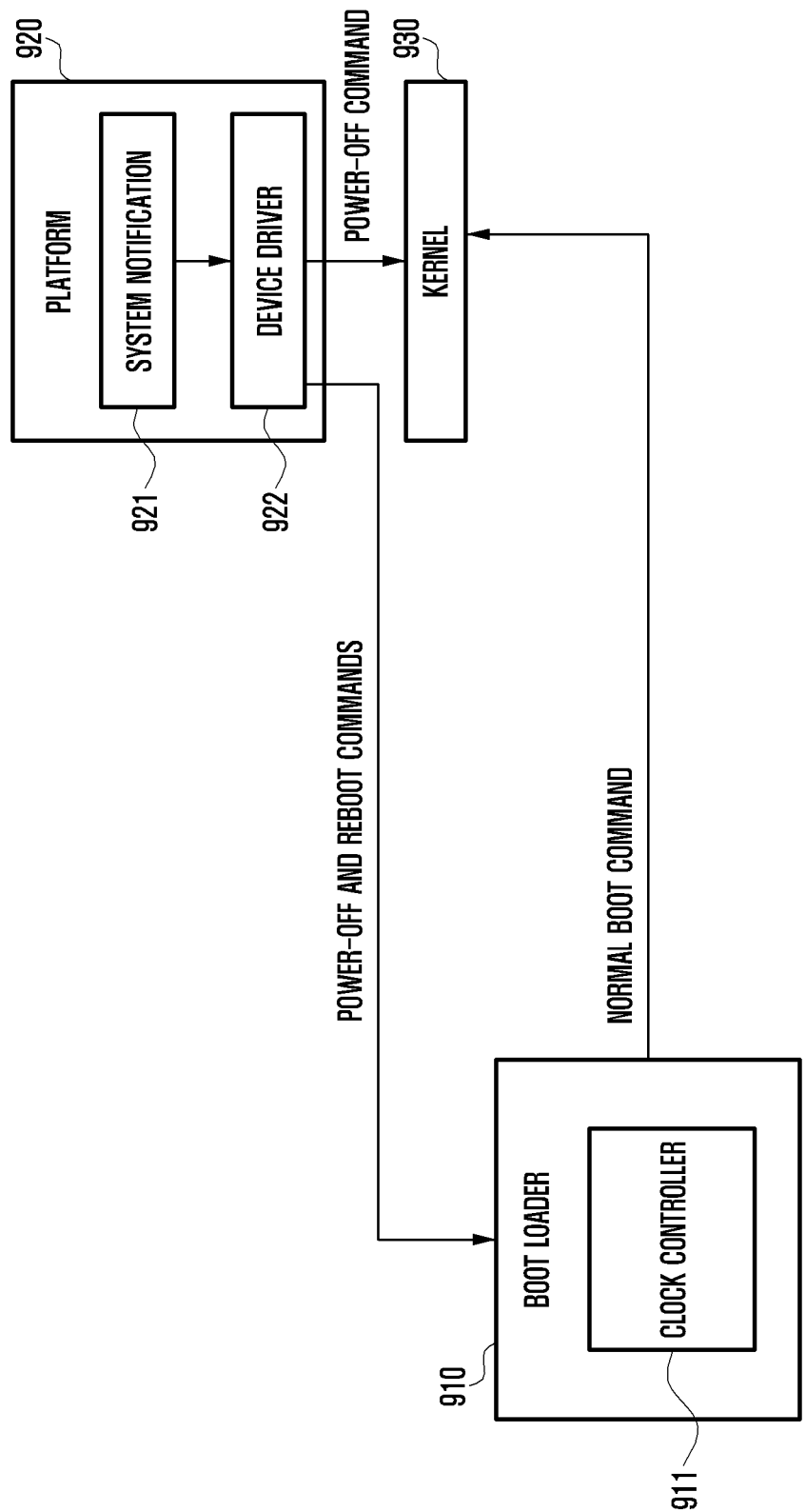
FIG. 9 is a block diagram explaining a method for controlling an electronic device according to various embodiments of the present disclosure.

FIG. 9 is a block diagram explaining a method for controlling an electronic device according to various embodiments of the present disclosure.

Referring to FIG. 9, an electronic device (e.g., electronic device 400) may include a boot loader 910, a platform 920, and a kernel 930. If a power management module (e.g., power management module 295 of FIG. 2) of the electronic device 400 determines that the power level of the battery (e.g., battery 296 of FIG. 2) 460 is equal to or lower than the specific level (e.g., first power level), the electronic device 400 may notify a platform thereof. The platform 920 may include a system notification 921 and a device driver 922. The system notification 921 of the platform 920 may transfer to the device driver 922 that the power of the battery (e.g., battery 296 of FIG. 2) 460 is equal to or lower than the specific level (e.g., first power level). If the system notification 921 transfers to the device driver 922 that the power of the battery (e.g., battery 296 of FIG. 2) 460 is equal to or lower than the specific level (e.g., first power level), the device driver 922 may transfer a power-off command and a reboot command to a kernel 930 and the boot loader 910. The kernel 930 may operate to enter into the power-off state through transferring of the power-off command and the reboot command, and if a first input of FIGS. 4 and 5 is generated, it may operate to display time related information on the display 430 under the control of the clock controller 911. If a second input of FIGS. 4 and 5 is generated, the boot loader 910 may perform normal booting operation, and may command the kernel 930 to perform the normal booting operation.

Figure 10:
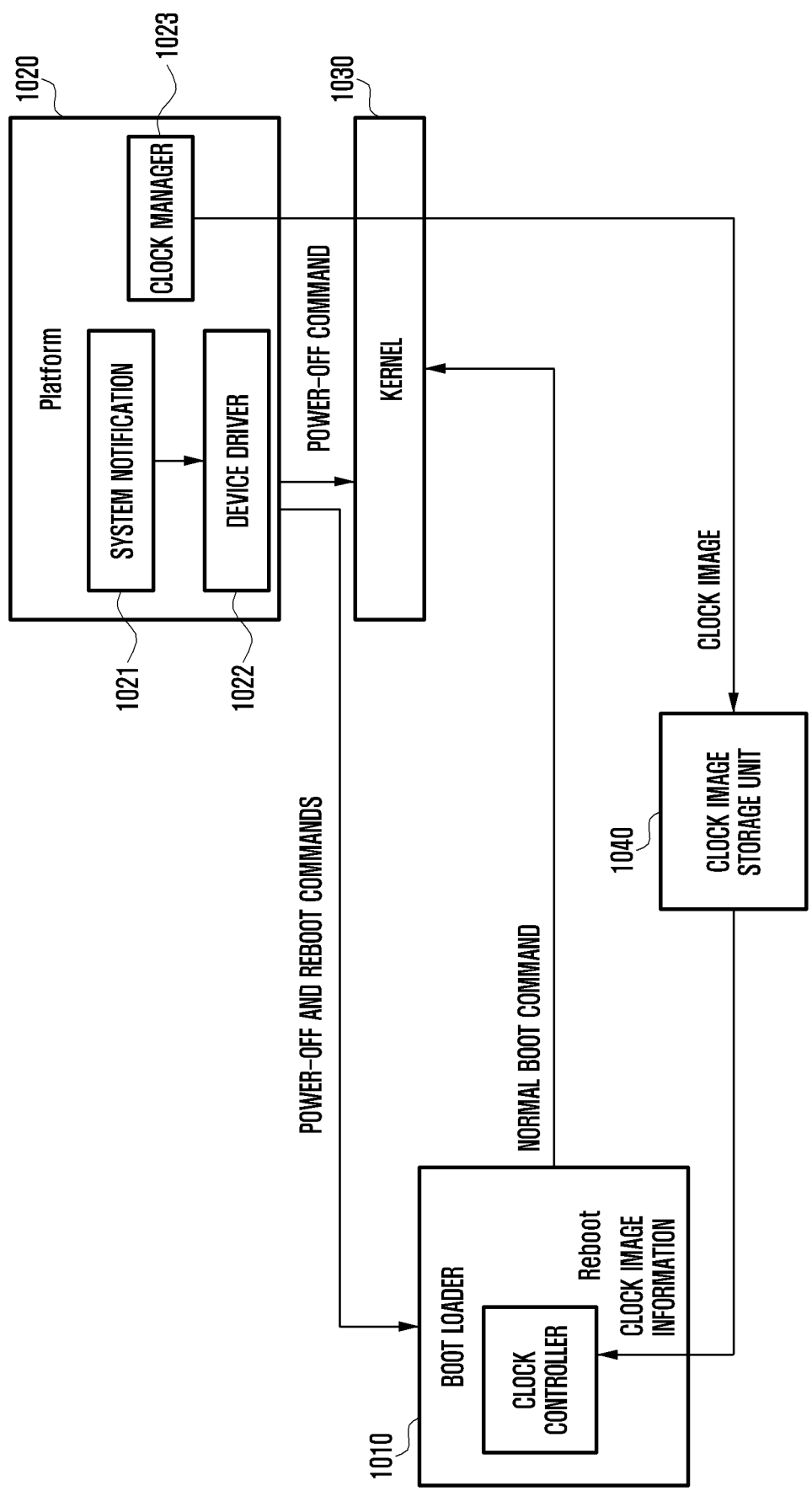
FIG. 10 is a block diagram explaining a method for controlling an electronic device according to various embodiments of the present disclosure.

FIG. 10 is a block diagram explaining a method for controlling an electronic device 400 according to various embodiments of the present disclosure.

Referring to FIG. 10, an electronic device 400 may include a boot loader 1010, a platform 1020, and a kernel 1030. If a power management module (e.g., power management module 295 of FIG. 2) of the electronic device 400 determines that the power level of the battery (e.g., battery 296 of FIG. 2) 460 is equal to or lower than the specific level (e.g., first power level), the electronic device 400 may notify the platform 1020 thereof. The platform 1020 may include a system notification 1021, a device driver 1022, and a clock manager 1023. The clock manager 1023 may receive current time information or time image information from an outside. The clock image information collected by the clock manager 1023 may be a clock background image to be displayed on a display 430, for example, may be a digital type clock image or an analog type digital image. The clock image may include, for example, a background image and/or the hands related image. The clock image information collected by the clock manager 1023 may be an image that can be downloaded from the outside. The time manager 1023 may store the current time information and/or time image information in a clock image storage unit 1040. The clock image storage unit 1040 may be a parameter partition, and may be one layer of the operating system (OS) that can be accessed by the boot loader even in a power-off state.

According to an embodiment, the system notification 1021 of the platform 1020 may transfer to the device driver 1022 that the power of the battery (e.g., battery 296 of FIG. 2) is equal to or lower than the specific level (e.g., first power level). If the system notification 1021 transfers to the device driver 1022 that the power of the battery (e.g., battery 296 of FIG. 2) 460 is equal to or lower than the specific level (e.g., first power level), the device driver 1022 may transfer a power-off command and a reboot command to a kernel 1030 and the boot loader 1010. The kernel 1030 may enter into the power-off state in accordance with the power-off command of the device driver. The boot loader 1010 may enter into the power-off state through transferring of the power-off command and the reboot command, and if a first input of FIGS. 4 and 5 is generated, it may operate to display time related information on the display 430 under the control of the clock controller 1021. The boot loader 1010 may enter into the power-off state through transferring of the power-off command and the reboot command, and if the first input of FIGS. 4 and 5 is generated, the clock controller 1021 may operate to read current time information and/or time image information from a clock image storage unit 1040, and display time related information on the display 430. If a second input of FIGS. 4 and 5 is generated, the boot loader 1010 may perform normal booting operation, and may command the kernel 1030 to perform the normal booting operation.

Figure 11:
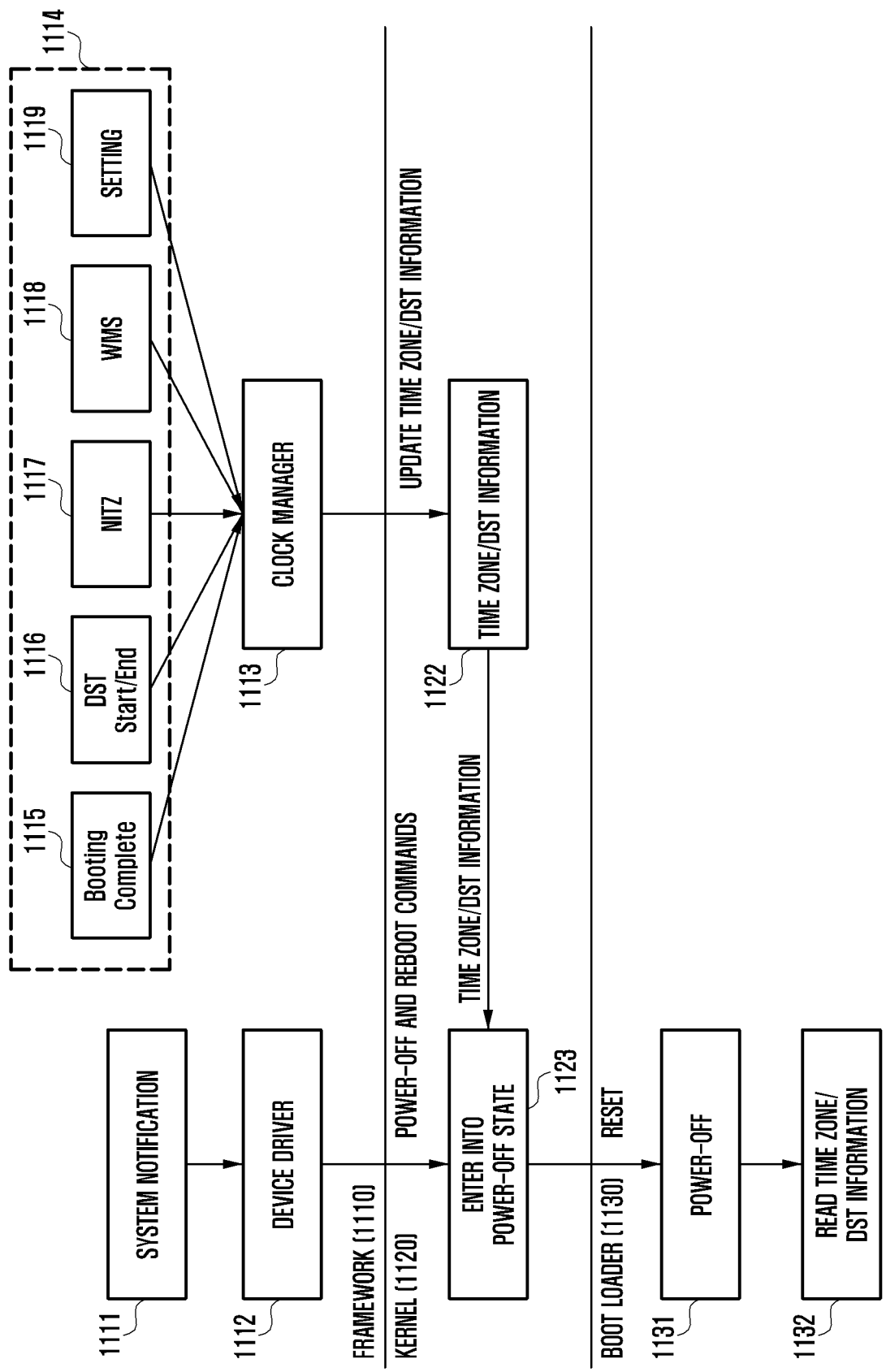
FIG. 11 is a hierarchy chart explaining a method for displaying time information of an electronic device according to various embodiments of the present disclosure.

FIG. 11 is a hierarchy chart explaining a method for displaying time information of an electronic device according to various embodiments of the present disclosure.

Referring to FIG. 11, an electronic device (e.g., electronic device 400) may include a framework 1110, a kernel 1120, and a boot loader 1130.

The framework 1110 may be the same as the platform of FIGS. 9 and 10. The framework 1110 may include a system notification 1111, a device driver 1112, and a clock manager 1113.

The clock manager 1113 may receive time information 1114, and may store time zone/DST information 1122 in the kernel 1120.

The DST is an abbreviation of daylight saving time, and is also called summertime. The time information 1114 may include at least one of booting complete information 1115, DST Start/End information 1116, network identity and time zone (NITZ) information 1117, WMS information 1118, and setting information 1119 set by a user. The time zone/daylight saving time (DST) information 1122 may be transferred to the boot loader 1130 to be stored in the boot loader 1130.

The system notification 1111 may transfer to the device driver 1112 that the power of the battery (e.g., battery 296 of FIG. 2) is equal to or lower than the specific level (e.g., first power level). If the system notification 1111 transfers to the device driver 1112 that the power of the battery (e.g., battery 296 of FIG. 2) is equal to or lower than the specific level (e.g., first power level), the device driver 1112 may transfer a power-off command and a reboot command to the kernel 1120 and the boot loader 1130.

The kernel 1120 may enter into a power-off state 1123 in accordance with the reboot command and/or the power-off command of the device driver 1112. The boot loader 1130 may enter into the power-off state 1131 through transferring of the power-off command and the reboot command from the kernel 1120, and if a first input of FIGS. 4 and 5 is generated, it may perform reading 1132 of the time zone/DST information stored in the boot loader 1130 to display the read information on the display 430.

In the description, the term "module" may include a unit that includes combinations of hardware, software, and firmware, and for example, the "module" may be interchangeably used with the term "logic, logical block, component, or circuit". The "module" may be the minimum unit or a part of components that are configured in a body. The "module" may be a minimum unit or a part thereof that performs one or more functions. The "module" may be mechanically or electronically implemented, and may include application-specific integrated circuit (ASIC) chip, field-programmable gate arrays (FPGAs), or programmable logical device, which perform certain operations, and which are known or to be developed. At least a part of a device (e.g., modules or their functions) or a method (e.g., operations) according to various embodiments of the present disclosure may be implemented by instructions that are stored in a computer-readable recording media (e.g., memory 830) in the form of programming modules. In the case where the instructions are executed by a processor (e.g., processor 820), the processor can perform functions corresponding to the instructions. The computer-readable recording media may include magnetic media, such as hard disks, floppy discs, or magnetic media (e.g., magnetic tapes), optical recording media (e.g., compact disc ROM (CD-ROM), digital versatile disc (DVD)), magneto-optical media (e.g., floptical disks), and a built-in memory. Instructions may include codes that are made by compilers or codes that can be executed by interpreters. The modules or programming modules according to various embodiments may include at least one of the above-described constituent elements, may omit parts thereof, or may further include other additional constituent elements. The operations that are performed by the module, programming modules, or other constituent elements according to various embodiments may be executed in a sequential, parallel, repetitive, or heuristic method. Further, at least partial operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying time information in an electronic device, the method comprising:
    transferring a power-off command and a reboot command to the electronic device if a power level of a battery is equal to or less than a first level;
    setting a power-off flag in a boot loader based on the transferring of the power-off command and the reboot command to the electronic device;
    entering into a power-off state;
    when the electronic device enters the power-off state, storing the time information and clock image information in the boot loader;
    determining whether a specific event occurs while in the power-off state;
    when the specific event occurs, generating a clock image through synthesis of time information and the clock image information under a control of the boot loader; and
    after checking the power-off flag setting, displaying, on a display, current time related information for a predetermined time under the control of the boot loader based on the specific event in the power-off state.

2. The method of claim 1, further comprising:
    displaying a message related to a power state on the display under a control of at least one processor if the power level is equal to or less than the first level.

3. The method of claim 1, further comprising:
    displaying an animation about a power-off on the display under a control of at least one processor if the at least one processor enters the power-off state.

4. The method of claim 1, wherein the specific event corresponds to a first input of pressing a power button.

5. The method of claim 1, wherein the transferring of the power-off command and the reboot command comprises transferring the power-off command and the reboot command to the boot loader and a kernel region.

6. The method of claim 1, further comprising:
    removing the power-off flag setting if it is determined that the specific event corresponds to a second input of pressing a power button or a charging event; and
    performing normal booting of the electronic device if it is determined that the specific event corresponds to the second input of pressing the power button or the charging event.

7. The method of claim 6, further comprising:
    displaying an animation about a charging state on the display under a control of at least one processor if it is determined that the specific event is the charging event.

8. The method of claim 6, further comprising:
    displaying an animation related to a power-on on the display under a control of at least one processor if it is determined that the specific event corresponds to the second input.

9. An electronic device comprising:
    a memory including a boot read only memory (ROM) configured to store a boot loader therein;
    a power manager controller;
    a power button configured to transfer a user input to the power manager controller;
    a display; and
    at least one processor configured to:
        transfer a power-off command and a reboot command to the electronic device if a power level of a battery is equal to or less than a first level,
        set a power-off flag in the boot loader based on the transfer of the power-off command and the reboot command to the electronic device,
        enter a power-off state,
        store time information and clock image information in the boot loader when the at least one processor enters the power-off state, and
        determine whether a specific event occurs while in the power-off state,
    wherein the power manager controller is configured to:
        control the boot loader to generate a clock image through synthesis of the time information and the clock image information,
        check the power-off flag setting in the boot loader, and
        control the boot loader to display on the display current time related information for a predetermined time based on the specific event in the power-off state.

10. The electronic device of claim 9, wherein the at least one processor is further configured to display a message about a power state on the display if the power level is equal to or less than the first level.

11. The electronic device of claim 9, wherein the at least one processor is further configured to display an animation about a power-off on the display if the at least one processor enters the power-off state.

12. The electronic device of claim 9, wherein the specific event corresponds to a first input of pressing the power button.

13. The electronic device of claim 9, wherein the at least one processor is further configured to transfer the power-off command and the reboot command to the boot loader and a kernel region.

14. The electronic device of claim 9, wherein the power manager controller is further configured to:
    remove the power-off flag setting if it is determined that the specific event corresponds to a second input of pressing a power button or a charging event, and
    perform normal booting of the at least one processor under a control of the memory if it is determined that the specific event corresponds to the second input of pressing the power button or the charging event.

15. The electronic device of claim 14, wherein the at least one processor is further configured to display an animation about a charging state on the display if it is determined that the specific event is the charging event.

16. The electronic device of claim 14, wherein the at least one processor is further configured to operate to display an animation related to a power-on on the display if it is determined that the specific event corresponds to the second input.

17. The electronic device of claim 9,
wherein the boot loader comprises a time controller,
wherein the time controller comprises a time synthesis device and a time display controller, and
wherein the time synthesis device is configured to transfer synthesized information derived from the synthesis of the time information and the clock image information to the time display controller.

* * * * *